United States Patent [19]
Dane

[11] Patent Number: 6,105,524
[45] Date of Patent: Aug. 22, 2000

[54] PIVOTING SAILING RIG

[75] Inventor: Robert Dane, Ulladulla, Australia

[73] Assignee: Solar Sailor Pty., Ltd., Ulladulla, Australia

[21] Appl. No.: 09/309,023

[22] Filed: May 10, 1999

Related U.S. Application Data

[63] Continuation of application No. PCT/AU97/00766, Nov. 11, 1997, abandoned.

[30]   Foreign Application Priority Data

Nov. 11, 1996 [AU]  Australia ................................. 3509/96
Nov. 29, 1996 [AU]  Australia ................................. 3907/96
Apr. 10, 1997 [AU]  Australia ................................. 6117/97

[51] Int. Cl.$^7$ ................................................. B63B 35/00
[52] U.S. Cl. .................................. 114/39.21; 114/102.27
[58] Field of Search ........................... 114/39.11, 39.21, 114/39.26, 39.27, 39.29, 39.32, 91, 92, 93, 102.1, 102.16, 102.18, 102.22, 102.23, 102.29, 104

[56]   References Cited

U.S. PATENT DOCUMENTS

| | | | |
|---|---|---|---|
| 2,319,999 | 5/1943 | Jennings . | |
| 2,940,688 | 6/1960 | Bland ................................. | 114/102.16 |
| 4,453,483 | 6/1984 | Shallenberger . | |
| 4,852,507 | 8/1989 | Ryon et al. . | |
| 5,131,341 | 7/1992 | Newman . | |

FOREIGN PATENT DOCUMENTS

| | | |
|---|---|---|
| 50194/72 | of 0000 | Australia . |
| 21817/83 | 3/1982 | Australia . |
| 2655309 | of 0000 | France . |
| 3528870 A1 | of 0000 | Germany . |
| 3836259 A1 | of 0000 | Germany . |
| 413679 A1 | of 0000 | Germany . |
| 2160165A | 12/1985 | United Kingdom . |
| 2234723A | 2/1991 | United Kingdom . |

*Primary Examiner*—Jesus D. Sotelo
*Attorney, Agent, or Firm*—Akin, Gump, Strauss, Hauer & Feld, LLP

[57]   ABSTRACT

A pivoting sailing rig adapted for use on a vehicle, such as a watercraft, includes a frame with spaced apart primary shafts which are oriented to rotate about and move axially along axes which are generally parallel to the center line or fore-aft axis of the watercraft. Wing sails are mounted on coupling elements secured to the primary shafts and are connected to rigging for rotating the wing sails about their longitudinal axes to vary the angle of attack, respectively. The primary shafts include control arms and rigging for rotating the primary shafts between substantially upright positions of the wing sails and laterally declined and reefed positions of the wing sails. The wing sails may include solar collectors mounted thereon and may be oriented in use to take advantage of wind as well as sunlight conditions to optimize sailing as well as energy collection.

19 Claims, 5 Drawing Sheets

PIVOTING SAILING RIG

CROSS REFERENCE TO RELATED APPLICATION

This application is a continuation of International Application No. PCT/AU97/00766 filed Nov. 11, 1997, now abandoned.

FIELD OF THE INVENTION

This invention relates to a pivoting sailing rig, and more particularly to a pivoting sailing rig which facilitates the collection of energy from both wind and sun. The invention has particular but not exclusive application to wing sails and to multi-hull waterborne craft utilizing multiple wing sails.

BACKGROUND

It is known from GB patent 2 234 723 to Crafer to provide a wing sail including solar collectors mounted thereon. More particularly, the Crafer patent discloses a multi-hull waterborne craft including an assembly of three wing sails, each wing sail being rotatable in concert about its longitudinal axis and the assembly of wing sails itself rotatable about a vertical axis coincident with the longitudinal axis of the middle wing sail. For stowage, the assembly of wing sails can be rotated to a line abeam configuration at which the assembly can then be stowed by pivoting the assembly about a horizontal abeam axis to lie the assembly down on the deck of the craft.

SUMMARY OF THE INVENTION

According to one aspect the invention resides in a vehicle including a wing sail pivotable at its base about a reefing axis parallel to the fore-aft axis of the vehicle whereby the wing sail can be reefed between a substantially upright position and a substantially horizontal position, the vehicle includes reefing means for controlling the reefing of the wing sail relative to the vehicle about the fore-aft axis, the wing sail defining a longitudinal axis and being rotatable about its longitudinal axis whereby the wing sail can be feathered. The vehicle also includes feathering means for controlling rotation of the wing sail about its longitudinal axis. The wing sail includes solar collecting means and wherein the reefing and feathering of the wing sail can be used to optimize energy collection from sun and wind.

In one preferred embodiment there are a pair of transversely spaced wing sails.

In another aspect the invention resides in a vehicle including a sail, the sail being mounted at its base to the vehicle for pivotal movement about an axis which is parallel to the longitudinal axis of the vehicle, reefing means being provided for pivoting the sail between an upright position and a reefed position.

The present invention in another aspect relates to a method of pivotably mounting a sail to a vehicle, the method including mounting the sail to the vehicle on a pivot axis which is parallel to the longitudinal axis of the vehicle such that the sail is pivotable in a plane which is transverse to the longitudinal axis of the vehicle to thereby reef the sail, and such that the sail is restricted to movement in said transverse plane.

In a preferred embodiment, the sail is a wing sail and the wing sail includes a solar collector. In one form, the vehicle includes a pair of wing sails, the wing sails being transversely spaced across the vehicle and being selectively movable to positions to optimize sailing effort and solar light collection.

DETAILED DESCRIPTION OF PREFERRED EMBODIMENTS

Figure 1:
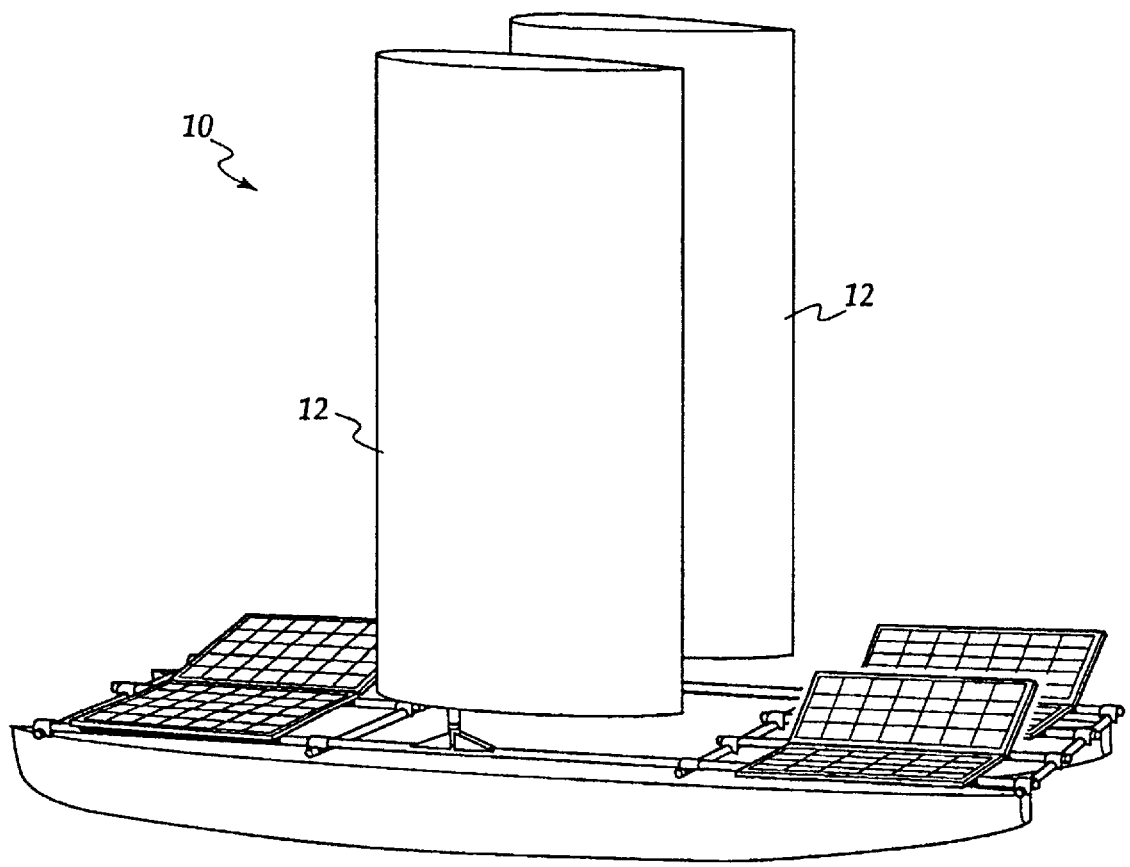
FIG. 1 is a side perspective view of a craft incorporating a pair of wing sails.
Figure 2:
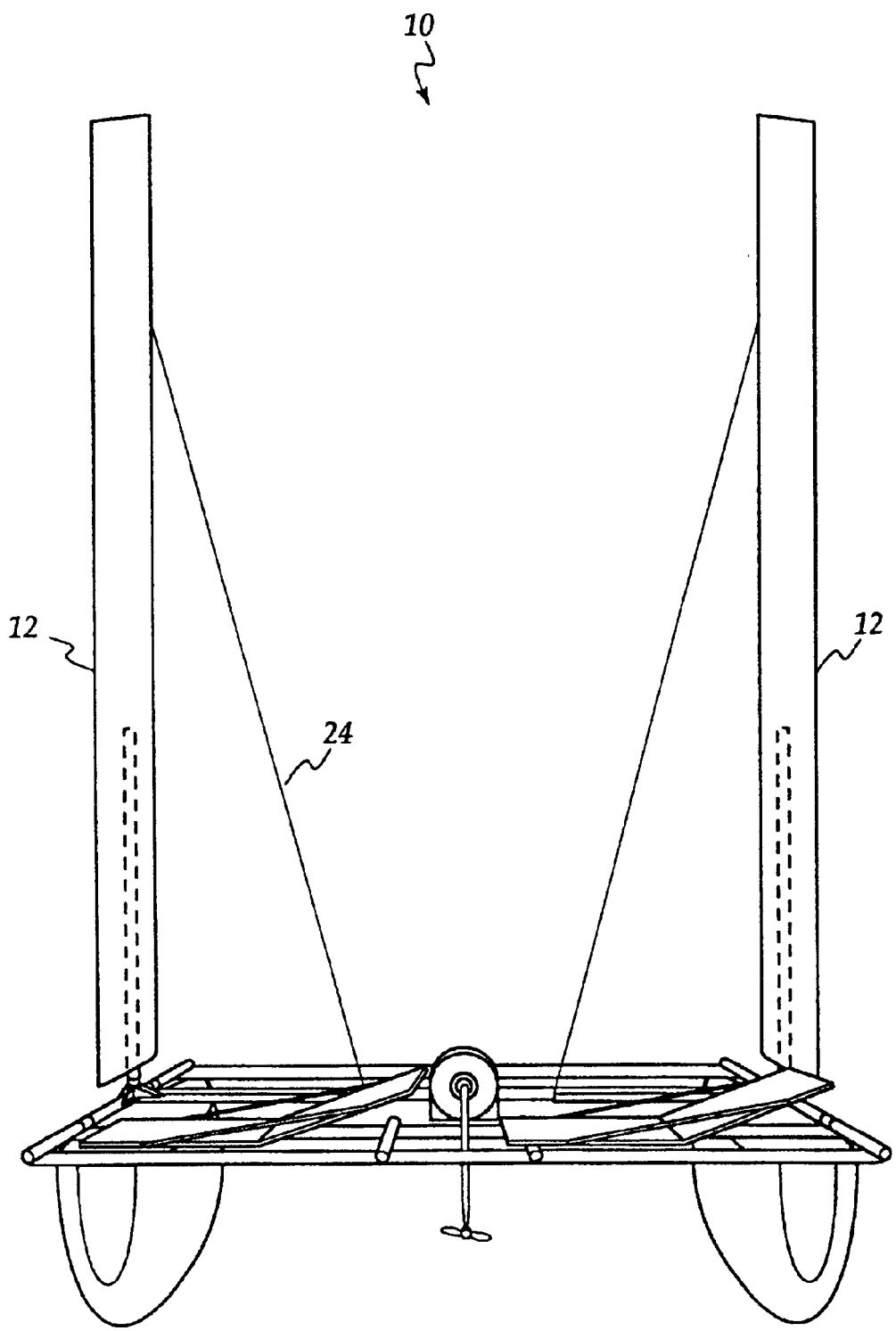
FIG. 2 is an end view of the craft of FIG. 1 with both wing sails in a generally upright configuration.
Figure 3:
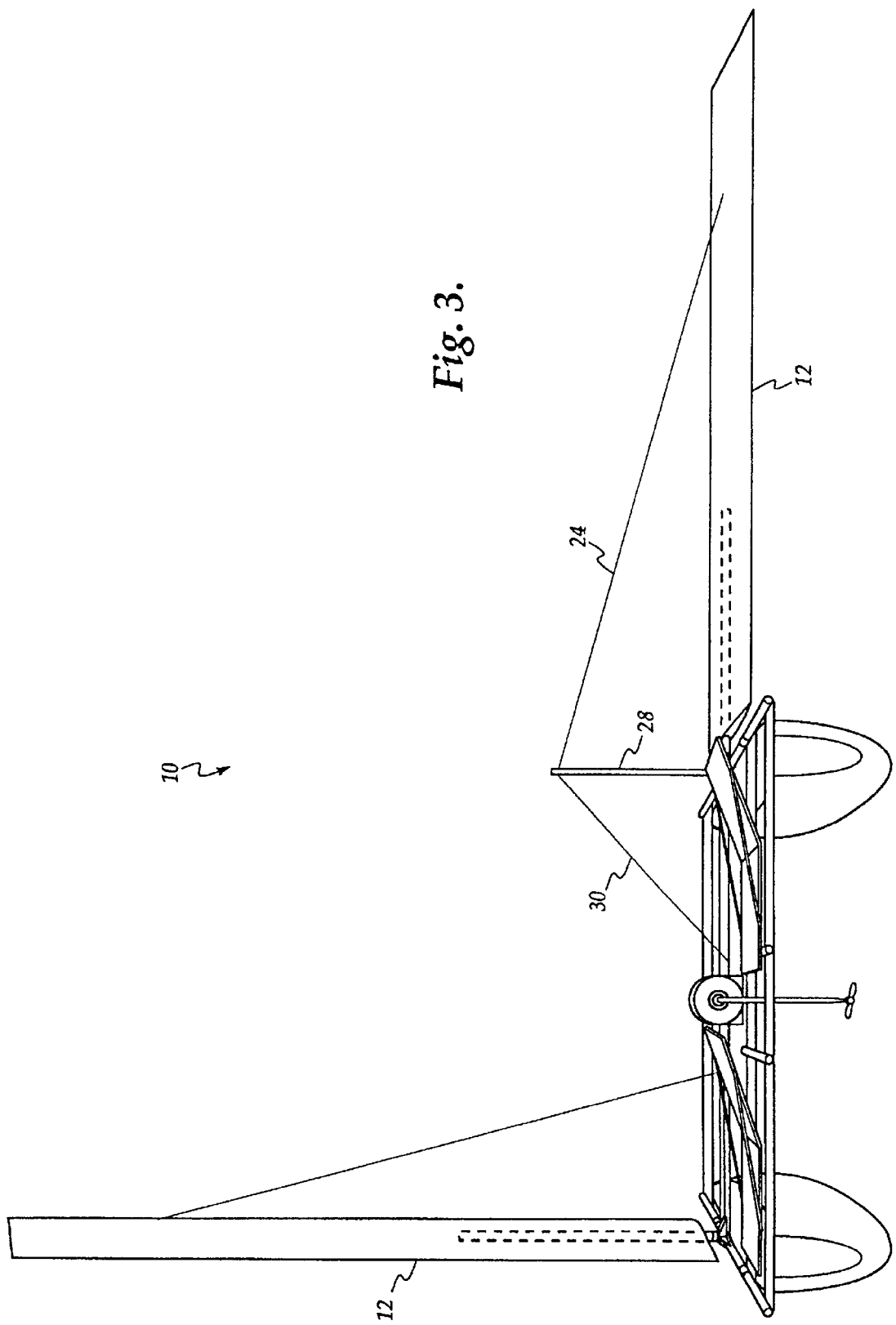
FIG. 3 is an end view of the craft of FIG. 1 with one of the wing sails in an upright configuration and one in a reefed position.

FIGS. 1, 2 and 3 illustrate a vehicle in the form of a watercraft comprising a catamaran 10 incorporating a pair of sails comprising wing sails 12. These wing sails 12 are laterally spaced across the craft 10 and are disposed adjacent the opposite sides of the craft with a surface carrying a solar panel located on the inwardly facing surfaces of the sails. Alternatively, both sides of the sail bear solar collectors or, alternatively again, the sail is transparent and double-sided (bi-facial) solar collectors are safely located within the sail.

The wing sails 12 extend from the craft 10 in a wing or arm-like manner and, together with the deck of the craft, they present three solar collecting surfaces which together define a flat or concave solar collector when viewed in the fore and aft direction as shown in FIGS. 2 and 3.

A coupling arrangement is provided to mount the proximal end of each wing sail 12 to the craft 10 so as to provide movement of the sails relative to the craft.

Figure 4:
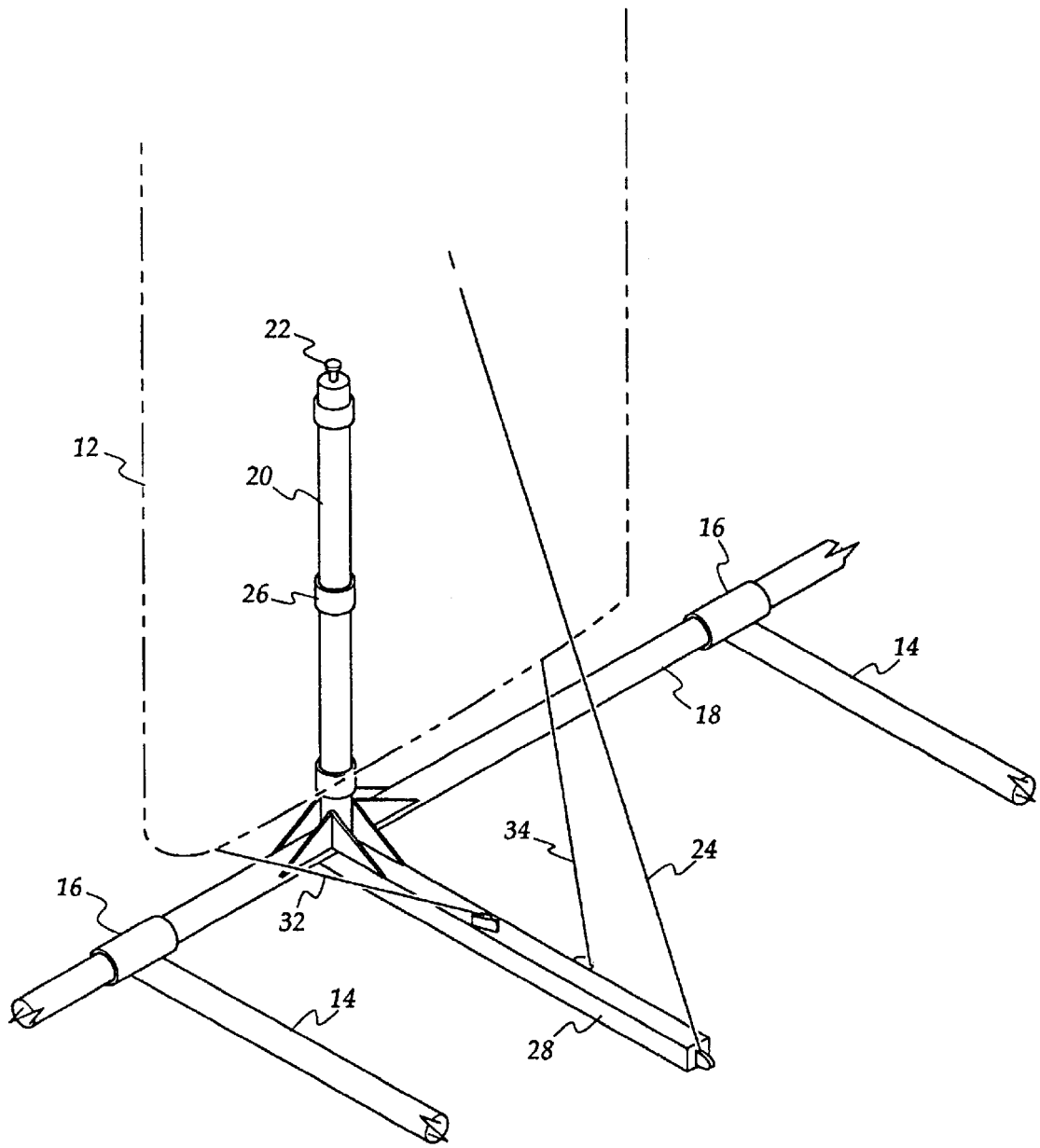
FIG. 4 is a detailed view of one preferred coupling arrangement which can be used to mount the wing sail to the craft.

With reference to FIG. 4, the craft 10 incorporates a frame structure on its deck. The frame structure includes a series of laterally extending members 14. These laterally extending members 14 incorporate hollow cylindrical riggers 16 at their outer ends. These riggers 16 each define a central passage which extends parallel to the center line of the craft 10 and are disposed adjacent to the outer sides of the craft.

As best illustrated in FIG. 4, the riggers 16 are adapted to mount a primary shaft 18 of the coupling arrangement. The primary shaft 18 is rotatable within the riggers 16 so as to be rotatable about an axis which is substantially parallel with the center line of the craft 10. Moreover, the primary shaft 18 is also mounted for limited axial movement in the riggers 16.

A male coupling element 20 extends radially outwardly from the primary shaft 18 and is adapted to be located within a bore in the wing sail 12 (or mast of a sail) to thereby mount the wing sail or sailing rig onto the primary shaft. In this arrangement, the longitudinal axis of the wing sail 12 is disposed substantially perpendicular to the axis of the primary shaft 18.

In the illustrated form, the male coupling element 20 incorporates a height adjustment member 22 adapted to adjust the spacing between the wing sail 12 and the primary shaft 18. Furthermore a stay 24 is provided to secure the wing sail 12 in position on the male coupling element 20. A benefit of using the stay 24 is that, as it is under tension, it enables a distribution of the loading along the wing sail.

With the arrangement, rotation of the primary shaft 18 causes the wing sail 12 to move from a generally upright configuration, as illustrated in FIG. 2, to a lateral or reefed position as illustrated in FIG. 3. Furthermore, axial movement of the primary shaft 18 enables the position of the mounting of the wing sails 12 to be varied in the fore-aft direction. In some embodiments the primary shaft may also be moved inboard or outboard of the craft.

The coupling arrangement is also adapted to allow rotation of the sailing rig or wing 12 about its longitudinal axis (i.e. "feathering"). This rotation is provided by rotation of the wing 12 about the male coupling element 20. To facilitate this movement, bushes 26 are disposed along the male coupling element 20, FIG. 4. With this arrangement, the angle of attack of the wing sail 12 may be varied while the wing sail is in a generally upright configuration relative to the craft or in a reefed or partially reefed configuration where it extends laterally to the craft. This rotation enables variation in the lift characteristics of the wing sail 12, enables the heading of the craft 10 relative to the wind to be varied for effective sailing at various angles to the wind direction, and optimum orientation to the sun for solar collection.

The coupling includes a control arrangement to control the pivoting or reefing of the wing sail 12. In the illustrated form, this control arrangement includes a control arm 28 which extends radially outwardly from the primary shaft 18 in angular spaced relationship to the male coupling element 20. In the illustrated form, the angle formed between the control arm 28 and the male coupling element 20 is in the vicinity of 90°.

To control the inclination of the wing sail 12, rigging 30 (FIG. 3) is provided between the control arm 28 and the deck of the craft 10. The rigging incorporates ropes, pulleys and cleats and is arranged to locate the control arm 28 in preselected positions relative to the deck of the craft 10 (of course this control may be provided by hydraulics or other means). This in turn dictates the angular position (reefing) of the wing sail 12. A pulley system (not shown) is preferably used with the ropes to provide a mechanical advantage to assist in positioning of the wing sails 12.

To control rotation of the wing sail 12 about its longitudinal axis, rigging 32, 34 (FIG. 4) is provided between the respective leading and trailing edge of the wing sail and the control arm 28. Through adjusting the rigging, the angle of attack of the wing sail 12 can be controlled. Furthermore the wing sail 12 can be luffed or feathered. Again, this control may be achieved by hydraulics, electric motors or other means.

As best illustrated in FIGS. 2 and 3, the control arms 28 extend inwardly onto the deck of the craft 10. With this arrangement, the craft 10 can be operated by one or two persons as each of the control arms can be accessed from the center of the craft thereby enabling the positions of the two wing sails 12 to be controlled. Moreover in this position, the craft rudder and motor can also be easily accessed.

Figure 5:
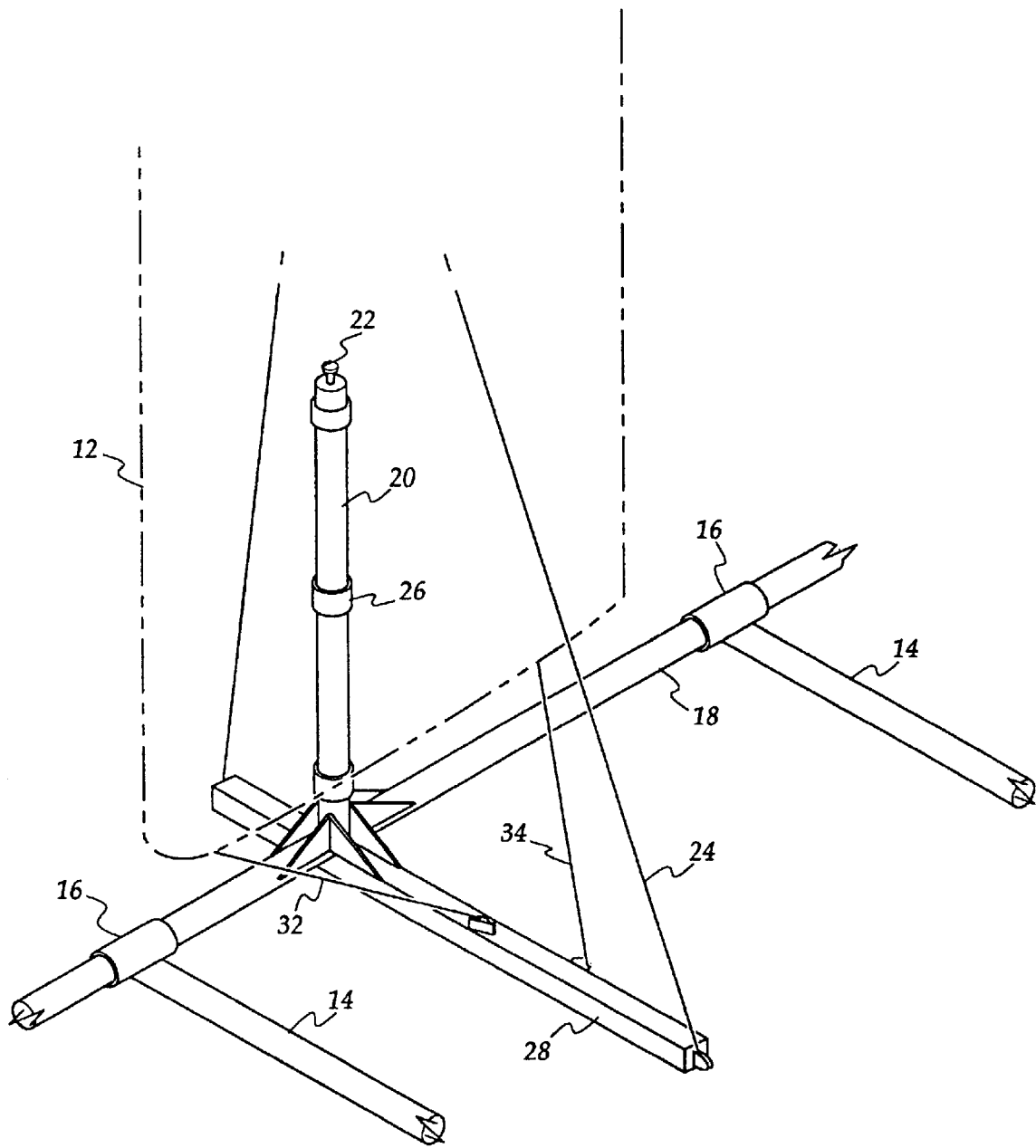
FIG. 5 is an alternative coupling arrangement.

In a preferred embodiment, the wing sail 12 adopts a default semi-reefed orientation of 45 degrees by use of springs or other resilient means. This means that the wing sail 12 must be urged to the extreme upright and horizontal (fully reefed) positions shown in FIGS. 2 and 3, respectively. This is advantageous because, if the default position is the horizontal position shown in FIG. 3, it is difficult to raise the wing sail 12 due to a lack of mechanical advantage when the sail is horizontal. A modified coupling arrangement is shown in FIG. 5. As will be noted, the control arm 28 has been extended in the outboard direction. Thus, this outboard extension of the control arm can be used to urge the sail towards the fully reefed position.

The craft 10 exhibits high performance characteristics for solar powered motor sailing. The wing sails 12 mounted on the craft 10 with their aerodynamic shape and multi-directional movement capabilities are very versatile allowing a plurality of additional functions as compared to traditional rigging. These include being able to impart lift or stability forces to the craft, being able to change the characteristics of the craft such as its center of gravity and windage, and being able to precisely adjust the solar collectors on the sails to face the sun. Mounting the solar panels on the wing sails 12 enables a large surface of solar collecting to be incorporated on the craft 10 without unduly affecting the performance of the craft. Moreover, because of the angular adjustment possible with the wing, the solar panels are able to provide maximum exposure to the surface of the assembly for solar collecting. By mounting the wing sails 12, as shown, shading of the deck is avoided and the deck space can be advantageously used for solar collection.

The advantages provided by the wing sail assembly of the invention in solar powered motor sailing is further enhanced by incorporating a plurality of wing sails in the craft as it enables various combinations of functions to be carried out by the assemblies which are not possible by a single wing sail assembly. For example, one wing sail 12 can be adapted to be accurately tracking the sun or providing additional stability to the craft whilst the other wing sail 12 is in an upright configuration to provide forward drive to the craft. Moreover, the wing sail assemblies can work together to better optimize the force imparted to the craft.

The energy which can be harvested from the wind by a sail is proportional to the cube of the relative wind velocity. It follows that the use of solar energy to drive the craft increases the relative wind velocity (except when running downwind) thereby improving sailing efficiency.

It will be understood that any form of pivotal mounting can be used to mount the sail to the craft including resilient material, hinge mechanisms, etc.

It will be understood that alternative control means such as hydraulic, electric motors etc. may replace the cable rigging.

A major drawback with wing sails has previously been the inability to reef a wing sail. Traditionally, it has only been possible to feather or luff the sail. The present invention allows the partial or complete reefing of a wing sail and the mounting arrangement which achieves this result can also be advantageously used to allow the wing sails to track the sun for solar collection.

Finally, it will be understood that various alterations, modifications and/or additions may be introduced into the construction and arrangement of the parts previously described without departing from the spirit or ambit of the invention.

What is claimed is:

1. A vehicle including a wing sail pivotable at its base about a reefing axis parallel to the fore-aft axis of the vehicle whereby the wing sail can be reefed between a substantially upright position and a substantially horizontal position, the vehicle including reefing means for controlling the reefing of the wing sail relative to the vehicle about the fore-aft axis, the wing sail including solar collecting means and defining a longitudinal axis and being rotatable about its longitudinal axis whereby the wing sail can be feathered, the vehicle including feathering means for controlling rotation of the wing sail about its longitudinal axis, and wherein the reefing and feathering of the wing sail can be used to optimize energy collection from sun and wind.

2. A vehicle as claimed in claim 1, wherein there are a pair of transversely spaced wing sails on said vehicle.

3. A vehicle as claimed in claim 1, wherein the wing sail adopts a default semi-reefed position intermediate the substantially upright position and the substantially horizontal position.

4. A vehicle as claimed in claim 1, wherein the wing sail includes a socket or bore for receiving a coupling element whereby the wing sail is mounted relative to the vehicle.

5. A vehicle as claimed in claim 1, wherein the wing sail is transparent adjacent the solar collecting means and wherein the solar collecting means includes bi-facial solar collectors.

6. A vehicle as claimed in claim 5, wherein the bi-facial solar collectors are mounted inside a transparent skin which defines the exterior of the wing sail.

7. A vehicle as claimed in claim 1, wherein said vehicle includes two laterally spaced wing sails pivotable about respective reefing axes spaced apart on said vehicle.

8. A vehicle as claimed in claim 7 wherein both of said reefing axes are substantially parallel to a fore-aft axis of said vehicle.

9. A vehicle as claimed in claim 1 wherein the position of the wing sail is adjustable with respect to said vehicle along the fore-aft axis of the vehicle.

10. A pivoting sailing rig for a vehicle, such as a watercraft, said sailing rig comprising:
   a frame including spaced apart laterally extending members, said laterally extending members including means forming a central passage which extends in substantially the direction of a center line of said watercraft;
   a shaft journaled by said means forming said central passage for rotation with respect to said laterally extending members;
   a coupling element mounted on said shaft and extending radially outwardly from said shaft for supporting a sail thereon, said shaft being rotatable to move said sail between an elevated working position and a laterally extending reefed position; and
   control means for moving said shaft between said positions.

11. The pivoting sailing rig set forth in claim 10 wherein said control means comprises a control arm connected to said shaft and extending laterally therefrom at an angle with respect to said coupling element.

12. The pivoting sailing rig set forth in claim 10 wherein:
   said sail is mounted for pivotal movement about said coupling element.

13. The pivoting sailing rig set forth in claim 12 including:
   rigging connected to said sail and to said watercraft for adjusting the angle of attack of said sail.

14. The pivoting sailing rig set forth in claim 10 including two spaced apart shafts, coupling elements mounted on both of said shafts and sails mounted on both of said coupling elements for rotation about axes which are substantially parallel to the center line of said watercraft and for rotation about longitudinal axes of said sails, respectively.

15. The pivoting sailing rig set forth in claim 14 wherein:
   said sails are wing sails.

16. The pivoting sailing rig set forth in claim 15 wherein:
   said wing sails include solar collectors thereon.

17. A method of operating a sailing rig for a vehicle such as a watercraft, said sailing rig comprising a pair of spaced apart wing sails, said wing sails being mounted, respectively, on support structure for pivoting said wing sails about their longitudinal axes, respectively, to change the angle of attack of said wing sails, said support structure also being adapted to support said wing sails for movement about second axes, respectively, between substantially upright vertically extending positions and laterally inclined positions for reefing said wing sails, respectively, said method comprising the steps of:
   moving at least one of said wing sails about at least one of said axes to a position to modify the effect of wind acting on said one wing sail; and
   moving the other of said wing sails to a position to modify the intensity of sunlight acting on said other wing sail.

18. The method set forth in claim 17 including the step of:
   moving at least one of said wing sails along a fore-aft axis of said watercraft to a position to modify the effect of wind acting on said one wing sail.

19. The method set forth in claim 17 including the step of:
   moving both of said wing sails about said second axes to at least partially reef said wing sails, respectively.

* * * * *